United States Patent [19]

Wirguin et al.

[11] 4,280,415

[45] Jul. 28, 1981

[54] METHOD AND APPARATUS FOR DRYING AND PROCESSING MOISTURE-CONTAINING SOLIDS

[76] Inventors: Joseph M. Wirguin, 40 King George St., Jerusalem; Avraham Melamed, 31 Haoranim St., Kfar Shmaryahu, both of Israel

[21] Appl. No.: 5,835

[22] Filed: Jan. 23, 1979

[30] Foreign Application Priority Data

Jan. 23, 1978 [IL] Israel ................................ 53871

[51] Int. Cl.³ .............................................. F23G 5/04
[52] U.S. Cl. .................................... 110/224; 110/228; 110/234; 110/346; 34/28; 34/35; 34/40; 34/86; 34/166; 34/177
[58] Field of Search ..................... 366/297; 165/86; 99/471; 34/64, 65, 166, 168, 173, 177, 28, 33, 35, 86, 40; 110/228, 234, 346, 224

[56] References Cited

U.S. PATENT DOCUMENTS

| | | | |
|---|---|---|---|
| 2,062,025 | 11/1936 | Harrington | 110/228 |
| 2,622,342 | 12/1952 | Gouldunes et al. | 34/169 |
| 3,529,558 | 9/1970 | Tanner | 110/224 |
| 3,529,813 | 9/1970 | Portnov | 34/173 |
| 3,572,665 | 3/1971 | Vincent | 110/224 |
| 3,946,495 | 3/1976 | Osdor | 34/169 |

Primary Examiner—Larry I. Schwartz
Attorney, Agent, or Firm—Browdy and Neimark

[57] ABSTRACT

A method and apparatus for drying and processing moisture-containing solids comprising organic and/or mineral inorganic components, wherein a maximum utilization of energy is attained by providing for an energetic cross-linkage between the drying and subsequent processing stages. With energetic cross-linkage between a pair of the component units of a system at least some of the energy generated in a first component unit is fed for utilization in a second component unit and at least some of the energy from the second component unit is fed to the first component unit so as to serve as at least a partial energy input for that first component unit.

25 Claims, 4 Drawing Figures

METHOD AND APPARATUS FOR DRYING AND PROCESSING MOISTURE-CONTAINING SOLIDS

The present invention relates to a method and apparatus for drying and processing moisture-containing solids comprising organic and/or mineral inorganic components.

The invention seeks to attain a maximum utilization of energy by providing for an energetic cross-linkage between the drying and subsequent processing stages. With energetic cross-linkage between a pair of the component units of a system at least some of the energy generated in a first component unit is fed for utilization in a second component unit and at least some of the energy from the second component unit is fed to the first component unit so as to serve as at least a partial energy input for that first component unit.

In accordance with one aspect of the present invention there is provided a method of drying and processing of moisture-containing solids, wherein an energetically cross-linked process for the drying and subsequent thermal processing of moisture containing solids comprises the steps of:

(a) heating the moisture containing solids to a temperature below that of the decomposition of any organic component thereof so as substantially to dry the solids by evaporating out the moisture content thereof;

(b) condensing the vapours from step (a) at least partially in indirect heat exchange with the moisture containing solids and thereby transferring part of the enthalpy of these vapours to the moisture containing solids so as to contribute to the heating of step (a);

(c) upgrading the enthalpy of the condensate formed in step (b) by utilisation of the heat generated or released in the energetically cross-linked processing stage;

(d) utilising at least part of this upgraded enthalpy for completing the heating in step (a) and utilising any residual upgraded enthalpy in the energetically cross-linked processing stage; and (e) carrying out the thermal processing of the solids dried in step (a).

In accordance with a second aspect of the present invention there is provided an energetically cross-linked process for the drying and thermal processing of moisture containing solids comprising the steps of:

(a) heating the moisture containing solids to a temperature below that of the decomposition of any organic component thereof so as substantially to dry the solids by evaporating out the moisture content thereof;

(b) upgrading the enthalpy of at least part of the vapours formed in step (a) by utilisation of the heat generated or released in the energetically cross-linked processing stage;

(c) condensing at least part of the vapours from step (b) in indirect heat exchange with the moisture containing solids and thereby transferring part of the enthalpy of these vapours to the moisture containing solids so as to effect the heating of step (a);

(d) condensing any remaining vapours of those produced in step (a) and utilising their enthalpy and the residual upgraded enthalpy of the condensate from step (c) in the energetically cross-linked processing stage; and (e) carrying out the thermal processing of the solids dried in step (a).

Methods for drying and processing moisture-containing solids are known. However, most of the known processes do not provide for the energetic cross-linkage as they require outside heating sources, i.e. they also use energy not provided by the dried and processed solids. For example, U.S. Pat. No. 2,062,025 relates to a method and apparatus for treating moisture-containing substances, in particular liquid sewage. In order to utilize the heat of combustion of the dried sewage sludge for drying additional quantities of sludge to combustible dryness, it is necessary in accordance with the said U.S. patent specification to add additional fuel, such as fine coke, bituminous coal, wood shavings, or sawdust, or dried vegetable matter of any form. The U.S. specification also only describes a furnace as the sole processing installation for the dried sludge.

Another method and apparatus for drying moisture-containing solids, particularly domestic refuse and sludge cakes, is described in Israel patent specification No. 43,830. With this known method, however, drying takes place at very high pressures and temperatures (superheated steam being employed at pressures of about 23 kg./cm$^2$, and temperatures of about 600° C.) and in consequence organic and inorganic matter contained in the solids being dried is thermally decomposed. Furthermore steam recovered from the dryer has to be recompressed and reheated respectively to higher pressures and temperatures than those obtaining in the dryer so as to render it suitable for feeding to the turbine and this also requires additional energy. In view of the high pressure prevailing inside the pressurized dryer, highly complicated means have to be provided for feeding the raw sludge into the dryer. This is particularly the case in view of the fact that compacted refuse cannot constitute a pressure thight packing and without such special complicated means steam would escape into the atmosphere.

Furthermore, as a consequence of the thermal decomposition of the organic matter its volatile, mostly combustible components escape and are lost. From an energy point of view this loss more than counterbalances the gain obtained by re-introducing the evaporated moisture into the process. Furthermore it is clear that the discharge of volatile, permanent gas components (i.e. those not liquefied in the turbine condenser) into the atmosphere would create a serious ecological situation. Furthermore and most seriously, the vapours produced in the drying process are directly introduced into a thermal processing stage including a superheater and a turbine. These vapours undoubtedly have entrained in them dust originally contained in the refuse and the presence of this dust will ultimately lead to the blockage of the superheater and the development of a cracking process in the superheater with the consequent production of a blocking carbon deposit. Any dust not deposited in the superheater will penetrate the turbine and is liable to cause serious erosion of the turbine blades. Some of the volatile matter may partially condense in the lower turbine stages forming droplets (the dust particles serving as condensation nuclei) and as a consequence erosion of the turbine blades will be accelerated. The heavy condensate droplets are propelled outwardly by centrifugal force and finally come to rest in the interstices between the turbine rotor and stator. This gives rise to increased frictional resistance to motion with a consequent temperature increase with generally undesirable consequences.

These disadvantages in the prior art proposals are completely avoided or reduced in accordance with the process of the present invention where, on the one hand, the heating of the moisture containing solids is at a temperature below that of the decomposition of any organic components thereof and, on the other hand, dust is removed prior to condensation of the vapours and prior to introduction into the thermal processing stage. Additionally the condensate can be filtered and, if necessary treated chemically.

In accordance with a further aspect of the present invention there is provided apparatus for carrying out the process and comprising a drying installation and a thermal processing installation coupled thereto, said drying installation comprising an enclosure, moisture containing solid input means communicating with an upper inlet of said enclosure, dried solid output means communicating with a lower outlet of said enclosure, passage of said solid from said inlet to said outlet being under gravity along the height of said enclosure, a plurality of hollow heat exchange units rotatably and substantially horizontally mounted in said enclosure and spaced along the height thereof, each unit having a vapour inlet and outlet, at least some of said units being connected in series, with the vapour outlet of one unit being coupled to the vapour inlet of a succeeding unit and being provided with condensate drainage outlets and coupling means for effecting respective communication paths between said enclosure and said installation for the flow of vapours, condensate and dried solids.

In accordance with a still further aspect of the present invention there is provided an energetically cross-linked process for the drying and thermal processing of moisture containing solids comprising the steps of:

(a) heating the moisture containing solids to a temperature below that of the decomposition of any organic component thereof so as substantially to dry the solids by evaporating out the moisture content thereof;

(b) upgrading the enthalpy of a portion of the vapours from step (a) by utilisation of the heat generated or released in the energetically cross-linked processing stage;

(c) utilising this upgraded enthalpy for carrying out the heating in step (a) in direct heat exchange whilst maintaining the vapours which are thereby cooled at a temperature above their condensation point;

(d) condensing the remaining portion of the vapours from step (a) and utilising the condensate thus formed in the energetically cross-linked processing; and (e) carrying out the thermal processing of the solids dried in step (a).

For a better understanding of the present invention and to show how the same may be carried out in practice reference will now be made to the accompanying drawings in which.

Figure 1:
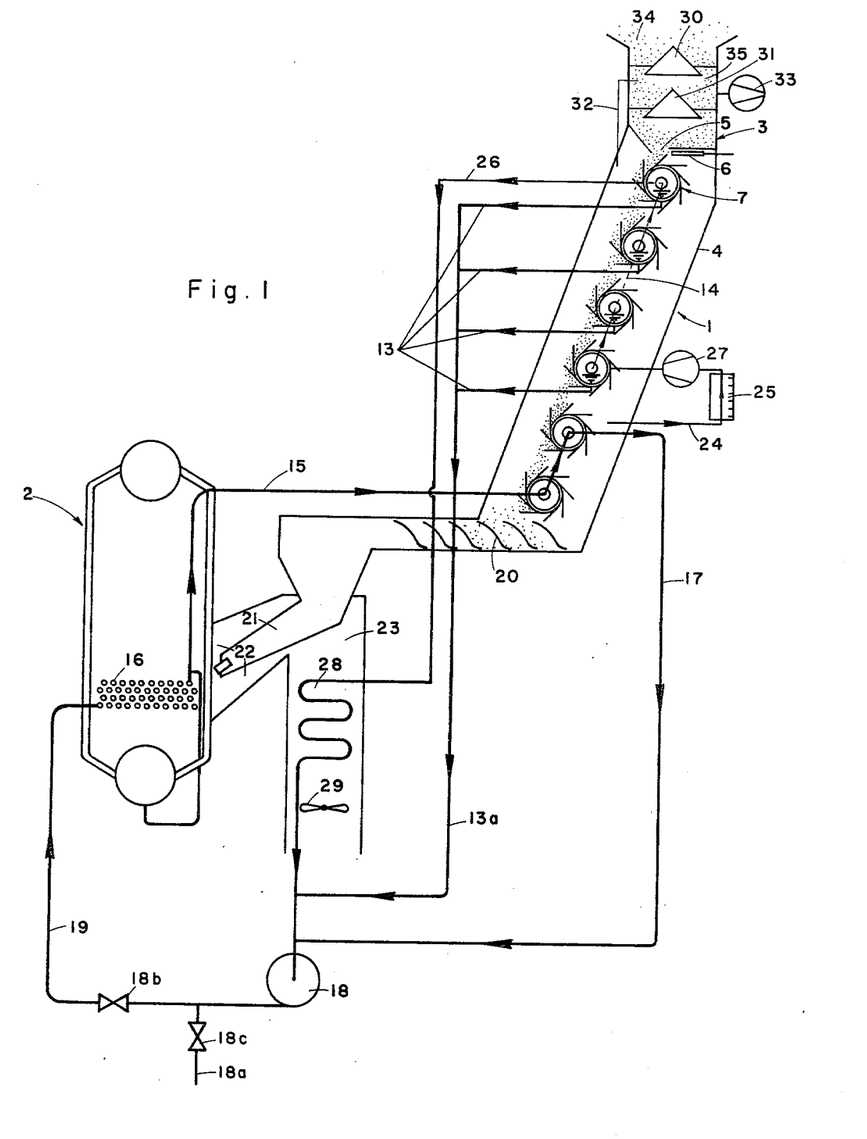
FIG. 1 is a schematic drawing of a drying installation according to the invention in conjunction with a conventional boiler.

In FIG. 1 the drying installation is generally designated as 1 and the boiler as 2. The drying installation comprises a hopper 3 situated on top of an inclined, elongated heat insulated, air and vapour tight casing 4 which communicates at its upper end with the hopper 3 via a closeable fuel inlet 5. The casing 4 defines a drying chamber. Inlet 5 is closeable by means of a closure 6 which is hydraulically operated (not shown).

Figure 3:
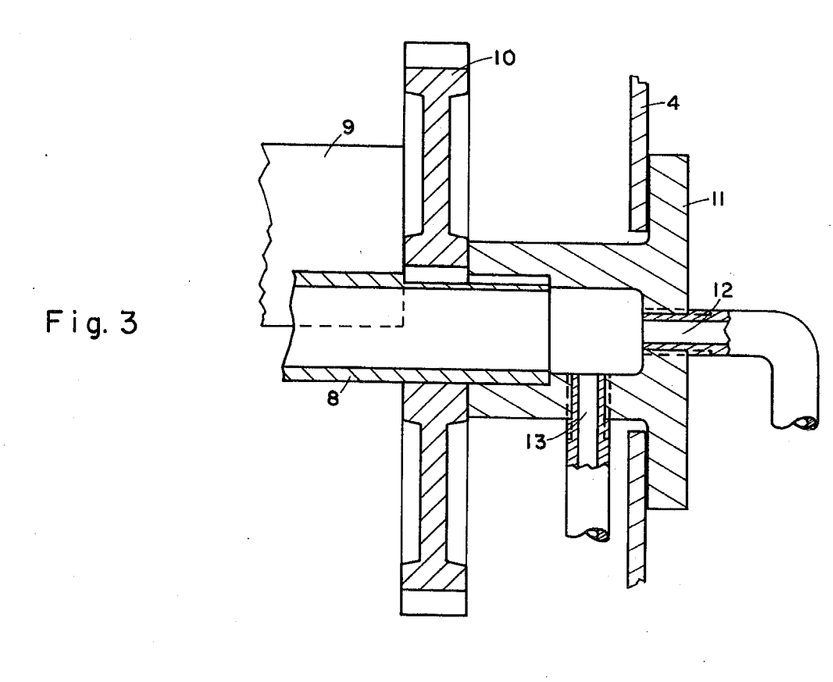
FIG. 3 is a longitudinally sectioned view of a detail of the drying installation shown in FIGS. 1 and 2 and FIG. 4 is a schematic drawing of a further embodiment in accordance with the present invention.

A plurality of spaced apart heat exchange units 7 (seen in detail in FIG. 3) are respectively rotatably and horizontally journalled inside the casing 4. Each unit 7 consists of a cylinder 8, formed with tangentially directed fins 9 (only one of which is shown in FIG. 3), and with sprocket wheels 10 keyed thereto. Each cylinder 8 is journalled at its extremities in flanged bearings 11 formed preferably of a self-lubricating plastic, the bearings 11 being secured, e.g. by bolting to the wall of the casing 4. Each cylinder is provided with vapour ports 12 at each end thereof and with a single drainage port 13. An upper group of four units 7 is coupled in series and in zigzag by conduits 14 which couple the outlet port 12 of one unit 7 with the inlet port 12 of a succeeding unit. The drainage ports 13 of the units 7 are all connected in parallel by a conduit 13a.

A lower group comprising two units is also coupled together in this manner but in the case of this group the inlet of the lowermost unit and the outlet of succeeding unit serve as inlet and outlet, respectively, for a heat conveying fluid which is fed to the inlet via a conduit 15 from a low pressure heat exchanger (economizer) 16 incorporated in the boiler 2, the fluid returning thereto via a conduit 17, pump 18 and conduit 19. The conduit 13a is also coupled to the low pressure heat exchanger 16 via the pump 18 where water is used as the heat conveying fluid.

The lowermost end of the casing 4 communicates via a screw conveyor 20 with a burner 21 which communicates with a combustion chamber (not shown) of the boiler 2. The burner 21 is situated within combustion air nozzles 22 which communicate with a main combustion air duct 23. The boiler 2 is of conventional design and its structural elements are thus not shown in detail.

The interior of the casing 4 communicates via a suction pipe 24 and an electrostatic precipitator 25 with the lowermost unit 7 of the upper group. The number of units 7 in the upper group is chosen so as to ensure, as far as possible, a complete condensation of the evaporated moisture flowing therethrough. The not condensed evaporated moisture, if any, leaves the uppermost unit 7 of the upper group through pipe 26 leading to the cross linked unit 2. A fan 27 feeds the dust free evaporated moisture into the inlet port 12 of the lowermost unit 7 of the upper group at such a pressure that sufficient temperature gradient is established between the interior of the heat exchanger units 7 and the interior of the casing 4 thus ensuring the flow of heat from the evaporated moisture to the solid in process of drying. The residual evaporated moisture not condensed in the upper group of heat exchanger units 7 flows to a surface condenser 28, which is situated within the main combustion air duct 23 of boiler 2. Also located within the main combustion air duct 23 is a main blower 29 serving to supply combustion air to the pre-heater of the boiler 2, the latter including the condenser 28. The outlet of the condenser 28 is linked to the inlet of the circulation pump 18.

The hopper 3 of the drying chamber is provided with an airlock comprising an inlet closure 30 and an outlet closure 31 which are both airtight and interlocked in such a manner that they can be opened consecutively, but not simultaneously. A pipe 32 connects the interior of airlock 4 with the interior of the hopper 3. A fan 33 is coupled to the hopper 3 for evacuating air therefrom.

The mode of use of the installation in drying and burning fuel will now be described.

Moist, preferably crushed fuel 34 enters the drying chamber from the hopper 3 via the airlock and through fuel inlet 5 and, in falling, successively impacts with the fins 9 of the successive units 7 causing them to rotate.

The moist fuel 34 enters the drying chamber at a temperature of about 20° C., flows downwards in the drying chamber in a turbulent flow and is partly dried by contact with the heat exchange units 7 of the upper group, giving off some of its moisture as water vapour and being heated in the process. The fuel 34 is substantially completely dried by making contact with the lower group of heat exchange units 7, and arrives at the lower end of the casing 4 at a temperature of about 105°–110° C. The dried fuel is transferred from the drying chamber by means of screw conveyor 20 to the burner 21 from where it enters the combustion chamber (not shown) of the boiler 2.

The moisture given off as water vapour from the drying fuel 34 enters the cylinder 8 of the lowermost unit of the upper group via the suction pipe 24 and the precipitator 25 (the latter freeing the vapour from suspended dust) and flows through the conduits 14 and the other three units 7 to the outlet of the upper unit of that group fed by the fan 27. From there it leaves the drying installation through pipe 26. As the evaporated moisture passes upwards through the heat exchange units 7, it progressively heats the successive units, most of it condenses, is drained off through the drainage ports 13 and conduit 14 and is pumped to the heat exchanger 16 by the pump 18. The residual vapour not condensed inside the cylinders 8 is passed through surface condenser 28, cooled by the combustion air supplied to the boiler by main air blower 29 and passed on to the heat exchanger 16 by pump 18 together with the condensate from the units 7 and the water recycled through the pipe 17. The pump 18 feeds water to the heat exchanger 16 at a pressure higher than that prevailing inside the casing 4, ensuring thus that a higher temperature will prevail inside the lower group of units 7 than the temperature inside the casing 4. A sufficient temperature gradient is established thereby so as to achieve a complete drying of the processed moisture containing solid. Non-return valves (not shown) must, therefore, be provided on the outlet of condenser 28 and on pipe 13a.

The pump 18 handles a certain volume of water flowing in a cloud circuit through the elements 15, the lower group of units 7, 17, 18, 19 and 16, and additionally the entire volume of water evaporated from the moisture bearing solid 34. This additional volume of water represents a surplus available as distillate for any suitable purpose and is evacuated out of the installation 1+2 through pipe 18a. The volumes of recycled and evacuated water are regulated by means of valves 18b and 18c, which can be hand operated or, if desired, automatically controlled by the residual moisture content of the dried solid before it enters the screw conveyor 20.

In many cases the water vapour boiled off from the fuel 34 carries with it dust whose presence cannot be tolerated in the condensate serving as feed water, or for other uses. In order to clean the water vapour of the dust, the electrostatic precipitator 25 serves to eliminate the dust prior to the entry of the water vapour into the (heating-condensing) units 7. Inside these units 7 the dust free vapour not being in direct contact with the drying solids can no longer be dust-contaminated. It may also happen that the vapour is wet and carries with it water droplets which could clog the electrostatic precipitator 25. For this eventuality a vapour dryer (not shown) can be interposed between the inlet of the lowermost heat exchange unit 7 of the upper group and the electrostatic precipitator 25.

It may in certain cases be advantageous to allow air entrapped in the moisture containing solid to penetrate into the interior of the casing 4. The presence of air will somewhat reduce the partial pressure of the water vapour and its boiling off will occur at a lower temperature. Separation of air and condensate can be subsequently carried out by conventional means in the condenser 28. Since the drying is being carried out at a temperature below the decomposition temperature of organic matter, malodorous or obnoxious discharges into the atmosphere are substantially prevented.

If, however, air and particularly its oxygen are to be prevented from intermixing with the boiled off vapour, the airlock consisting of the inlet closure 30, outlet closure 31 and the intermediate container 35 is provided above hopper 3 and the entrapped air is replaced with water vapour prior to discharging a batch of fuel 34 into the hopper 3. After filling the airlock with fuel 34 with closure 30 open and closure 31 closed, closure 30 is also closed and the air evacuated from the airlock container 35 by means of a vacuum pump 33 and replaced by water vapour from casing 4 through pipe 32, purging the contents of the airlock, and creating therein a vacuum sufficient to prevent a condensation of water vapour at the temperature of the fuel. The absence of oxygen in the fluid evacuated by the vacuum pump 33 is ascertained by means of a conventional detecting device (not shown) whereupon the vacuum pump 33 is shut off. Closure 31 is then opened and the contents of the airlock container dumped into hopper 3. Closure 31 is then closed, closure 30 opened again in order to fill airlock container 35 with a further batch of fresh fuel 34 and the above described procedure is repeated. Water vapour may be replaced by a neutral gas, for example boiler flue gas, in which case a fan is used instead of the vacuum pump 33. Gases dissolved in the condensate are purged from the condenser 28.

Instead of the heated condensate which flows through the lower group of heat exchange units 7, waste flue gases may be used for completely drying the fuel 34. In that event, conduits 15 and 17 are replaced by ducts with the duct 17 leading to an induced draught installation or to a smokestack (not shown). Instead of the combustion air which serves for condensing the water vapour, cold boiler feed water, for instance the condensate of a steam turbine can be employed. In that case a mixng condenser of conventional design is substituted for the surface condenser 28.

Instead of subdividing the heat exchange units 7 into two through only one of which passes the hot fluid, they may all be connected in series so as to form a single battery through which either hot boiler feed water or spent flue gases are passed. In this case, the evaporated water vapour is either condensed in its entirety in the surface condenser 28 cooled by the combustion air or in a mixing condenser (not shown) using cool boiler feed water.

In an alternative embodiment of the invention to be described with reference to FIG. 2 of the drawings, the task of the cooling medium is entirely assumed by the fuel and that of the heating medium by the evacuated moisture, the energy of which has been upgraded within the heat flow of the boiler. Thus, there is provided a closed cycle of part or of the totality of the evaporated moisture; it flows as condensed boiled-off water vapour to the boiler as feed water, returns as superheated steam to the drying plant and then returns as condensed water back to the boiler-economizer. In addition to this cycle, condensed boiled off moisture is tapped from the drying installation and can be used for any suitable purpose.

Figure 2:
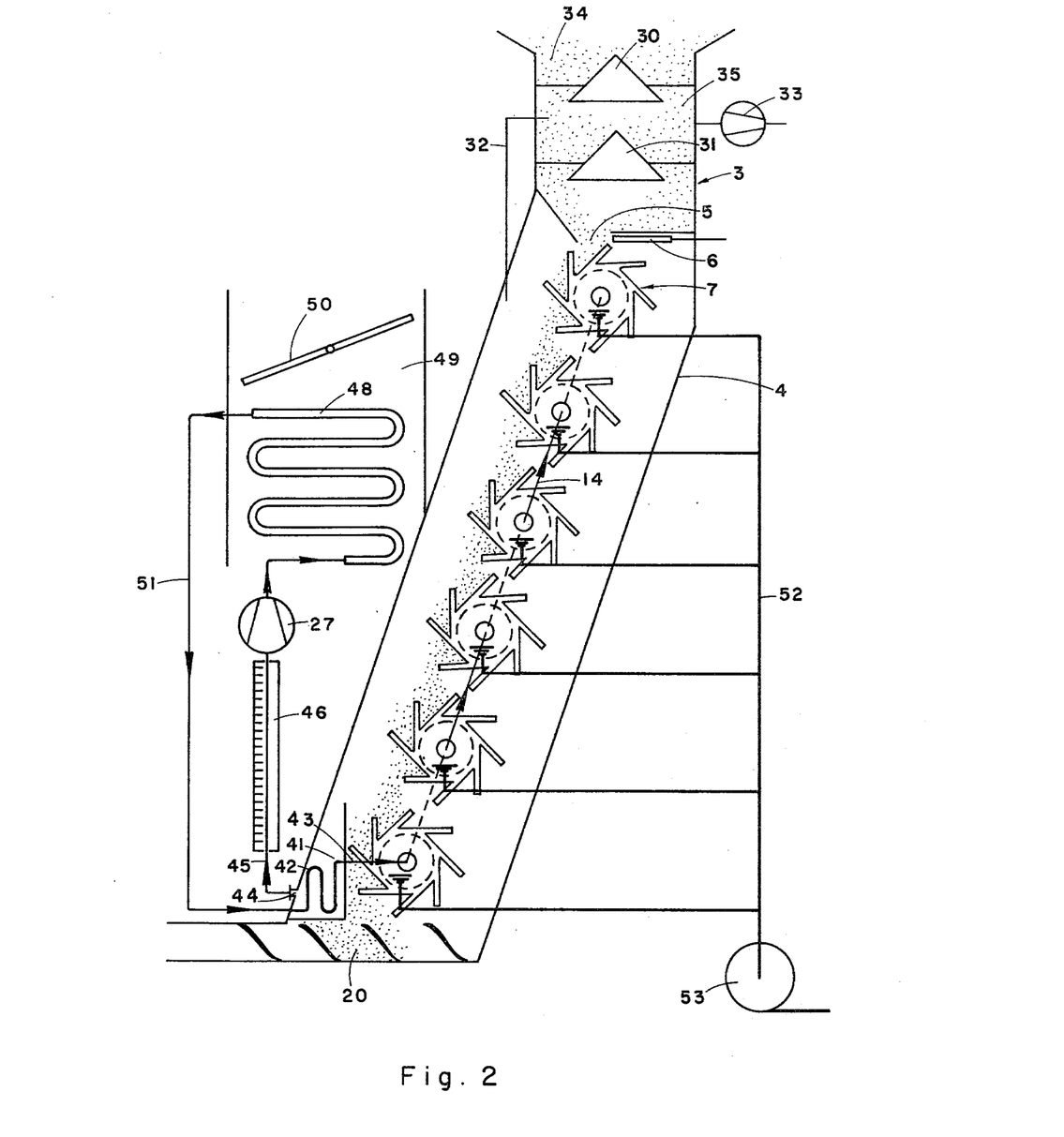
FIG. 2 is a schematic drawing of another embodiment of the drying installation.

FIG. 2 illustrates a drying plant for such a system. In this figure, structural elements which are identical to those shown in FIG. 1 are designated with the same reference numerals.

As in FIG. 1 the drying installation 1 comprises a drying chamber having at its upper end a hopper 3 and an airlock 30, 31, 35 and, at its lower end, a screw conveyor 20 for transferring the dried fuel 34 out of the drying chamber. In this embodiment all of the heat exchange units 7 form a single group and are connected in series. An enclosure 41 is defined in the lower end of the casing 4 in communication with the interior thereof in which enclosure is located a tubular coil 42. One end of coil 42 is connected to the inlet of the lowest heat exchange unit by a pipe 43. The enclosure 41 communicates, via a port 44 and a pipe 45 with an electrostatic precipitator 46 and a fan 27 with a superheater 48 which is placed in a duct 49 of the boiler (not shown). A thermostatically controlled damper 50 regulates the flow of flue gases to duct 49. The superheater 48 communicates with the other end of the coil 42 via a pipe 51.

The moisture containing solids (e.g. fuel) 34 entering the top of the casing 4 of the drying chamber from the hopper 3 through fuel inlet 5 falls downwards and in falling successively impacts the successive heat exchange units 7 causing them to rotate. The fuel is heated by the units and is dried substantially completely by the time it reaches the lowermost unit. The moisture evaporated from the fuel 34 is extracted from the enclosure 41 by means of fan 27 after passing over the heated coil 42, where any water droplets present are evaporated. In this way it is ensured that only vapour passes through pipe 45 and the electrostatic filter 46. From there the vapour passes through superheater 48 in which the desired superheat temperature of the evaporated moisture is regulated by the flow of the flue gases to duct 49 by means of the damper 50. After passing through the superheater 48, the vapours which have been up-graded into superheated steam pass through pipe 51 and into coil 42. From there, the steam enters the lowermost heat exchange unit via pipe 43 and rises through conduits 14 upwards and successively through all the heat exchange units.

The fuel contacting the heat exchange units is heated thereby and in turn cools the units so as to condense part of the steam in each unit. The number of units 7 is chosen so as to provide a sufficient heat exchange surface between the moisture bearing solid 34 and the drying medium (the upgraded evaporated moisture) and ensure thereby the condensation of the totality of the boiled-off moisture. The quantity of the boiled-off moisture need, however, not be identical with the volume of upgraded steam fed into the system of heat exchange units 7, the not condensed part thereof being recycled to the unit 2 of the installation. The condensate is drained off in parallel through a common pipe 52 and pumped to the boiler by a pump 53 to serve as boiler make-up water or any other purpose.

In its downward flow from the inlet 5 of the drying chamber to the screw conveyor 20, the fuel 34 will reduce in mass and most probably in bulk. The lowest and also the hottest heat exchange unit 7 will thus handle a highly depleted mass and possibly bulk of the fuel. In order to avoid overheating by the lowermost units, it may be advisable to increase the rate of rotation of the lowest unit 7 thereby shortening the time of contact between the fuel 34 and this hottest unit. For similar considerations the rates of rotation of the other units 7 may have to be adjusted. Their rates of rotation will be optimalized empirically. The preferred rotational rates of the various units 7 can be achieved by providing them with the sprockets 10 (seen in FIG. 3) of individually chosen pitch diameter, the sprockets being coupled by means of a common chain (not shown). Whilst the speed of this chain is constant, the rotational rates of the various units 7 can be altered as desired by suitable choice of sprocket pitch diameter.

Additionally, a brake mechanism of conventional design, for instance, a centrifugally operated brake (not shown), can be provided so as to control the speed of the chain. If desired, the speed of the chain as determined by this braking mechanism may be controlled as a function of the temperature of the dried fuel immediately above the screw conveyor 20. In this way overheating of the dried fuel will be avoided by reducing its time of contact with the units 7.

Alternatively, the pipe 19 or pipe 51 can be provided with a thermostatically controlled regulating valve 18b (not shown) which increases or diminishes the flow of hot fluid into the drying installation so as to avoid an overheating of the moisture containing solids beyond the decomposition temperature of the inorganic matter. A further possibility resides in the provision of a thermostat (not shown) which controls the damper 50 and thereby adjusts the superheat temperature of the water vapour recycled from the boiler to the drying chamber.

The rotational rate of the screw conveyor 21 is controlled by the fuel requirements of the boiler.

The throughput of the drying installation is regulated by means of the inlet closure 6 which controls the amount of raw moist solid 34 admitted into the drying chamber in accordance with the fuel requirements of the boiler.

By way of illustration, the following is a heat balance of the above described drying process, the technologically unavoidable losses (radiation losses, vapour losses of air barrier or airlock and vapour carried out of the drying chamber in the interstices of the fuel handled by the screw conveyor which losses are, in some cases, at least partly recuperable) being disregarded as are the power input of the auxiliaries—fans, pumps and screw conveyor:

| | |
|---|---|
| Moisture content of fuel | : 60% |
| Mean specific heat of dry fuel | : 0.2 cal/kg °C. |
| Temperature of raw fuel | : 20° C. |
| Pressure in drying chamber | : 1 kg/cm$^2$ |
| Pressure in superheater 48 | : 1.01 kg/cm$^2$ |
| Temperature of flue gases, exit boiler air pre-heater | : 160° C. |
| Superheated steam in closed circuit | : 3.30 kg/kg of solid |
| Temperature of superheated steam at inlet to drying enclosure 4 | : 130° C. |

| | | Cal |
|---|---|---|
| Heat input | | |
| 400 gr. dry fuel | 0.4 × 0.2 × 20 = | 1.60 |
| 600 gr. of moisture | 0.6 × 1 × 20 = | 12.00 |

|  |  |  |
|---|---|---|
| Total fuel | | 13.60 |
| Supplied by superheater as steam of 1.0.kg/cm² pressure and 130° C. enthalpy | 652.8 Cal/kg | |
| Evaporated moisture | 1.6 kg | |
| Recycled steam | 3.3 kg | 2545.92 |
| | | 2559.52 |
| Heat output | | |
| 400 gr. of fuel at 99.1° C. | 0.4 × 0.2 × 99.1 = | 7.93 |
| 600 gr. of condensate at 99.1° C. | 0.6 × 99.1 = | 59.46 |
| 3,900 gr. of Steam recycled to superheater 48 at 1.05 Kg/cm² pressure and 100° C., enthalpy~ | = | 2,492.10 |
| 639 Cal | | 2,559.49 |

The specific embodiments of the invention described hereinabove may be modified according to specific requirements. For example, the drying process described with reference to FIGS. 1 and 2 can be carried out at atmospheric pressure, in a vacuum, if it becomes necessary to lower the temperature of evaporation, or at superatmospheric pressure, in cases where higher evaporation temperatures are required. When the process is carried out in a vacuum, fan 27 is replaced by conventional vacuum pumps.

The drying process can be carried out at non-atmospheric pressures, and in this case a second and lower airlock similar to that consisting of elements 30, 31, 33, 35 is provided at the bottom of the drying enclosure and the screw conveyor 20, transporting the dried solid out of the drying installation 1 is fed from the hopper of this lower airlock. Furthermore, a total of four shut-off valves (not shown) are provided by means of which valves the pressure inside the airlock container is equalised either with the atmosphere or with that prevailing inside the drying enclosure.

A simple way of superheating the evaporated moisture and, if desired, of raising its pressure consists in mixing it with live superheated steam tapped at the boiler steam outlet. A preferred variant of this embodiment consists in having the auxiliary equipment of the cross-linked installation connected to the drying installation driven by steam counterpressure turbines, the exhaust steam of which is used to superheat the evaporated moisture.

The drying process can be fluidized with superheated evaporated moisture serving as the fluidization medium. Such a fluidized process is illustrated schematically in FIG. 4 of the drawings. Here an airlock-hopper assembly similar to that shown in FIGS. 1 and 2 of the drawings and identified by the same reference numerals is coupled via a feed pipe 61 to a fluidized bed enclosure 62 having a vapour inlet port 63 and a vapour outlet port 64 and a dried solid outlet 65 which is coupled to a screw conveyor 20. The airlock is coupled to a purging vapour source in the enclosure 62 via a pipe 32. The vapour outlet 64 is coupled via a pipe 67, cyclone 68, electrostatic precipitator 69, fan 70, on the one hand via a control valve 71 with a surface condenser 28 and, on the other hand via a control valve 72 with a superheater 48.

Figure 4:
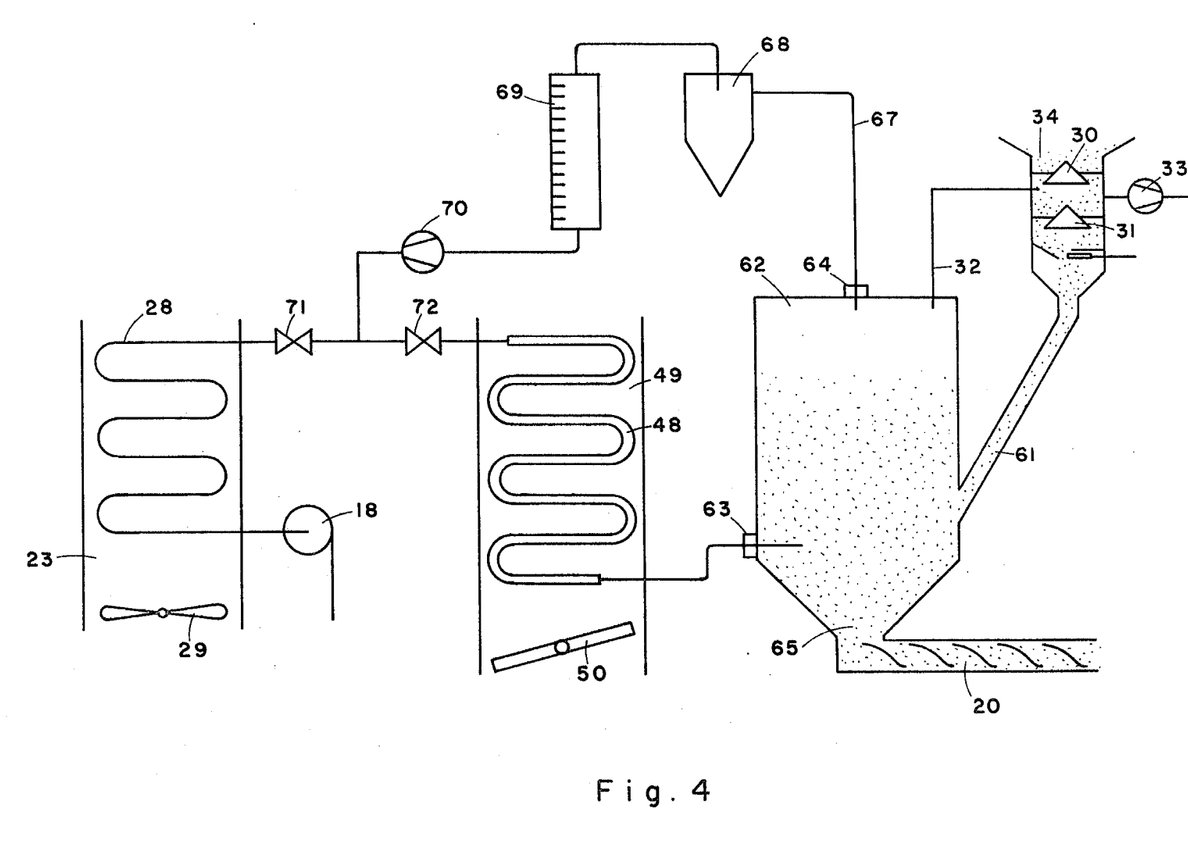

The moisture containing solids 34 are fed from the airlock-hopper assembly via the pipe 61 to the fluidized bed enclosure 62 in which drying takes place in direct heat exchange between the moisture containing solids and upgraded evaporated moisture. The evaporated moisture, whose temperature is not allowed to fall below the boiling point passes through the cyclone 68 and precipitator 69 and a portion thereof flows, in a closed cycle through the superheater 48 where it is upgraded and from there to the vapour inlet 63 of the enclosure 62 so as to undergo heat exchange with the solids to be dried. As in the embodiment shown in FIG. 2 of the drawings the superheater 48 is placed inside the duct 49 of the boiler and the volume of fluegases admitted thereto is regulated by means of the damper 50.

The remaining portion of the vapour (substantially identical in quantity with the quantity of water vapour evaporated from the solids) passes through the valve 71 to be condensed in the condenser 28, the condensate being fed by the pump 18 as make-up water to the boiler 2 or to be used for any other purpose. The valves 71 and 72 can be adjusted so as to regulate the relative amounts of vapour fed respectively to the superheater 48 and the condenser 28.

The process just described hereinabove in conjunction with FIG. 4 is particularly applicable for the drying of solids having a relatively low moisture content.

It will be realised that condensation of the vapour in the condenser 28 in all the embodiments serves to preheat the combustion air.

In all cases either the vapours are subjected to drying and filtering prior to their condensation and/or the condensate is subjected to filtering prior to its utilisation in the energetically cross-linked processing. If necessary the condensate may undergo appropriate chemical treatment which may be necessary in view of the particular nature of the moisture containing solids.

In all cases dust reclaimed from the cyclones or electrostatic precipitators can be collected, granulated briquetted or recycled to the airlock hopper.

In accordance with a feature of the present invention the problem of reclaiming the sensible heat of spent ashes of the boiler is also solved, particularly of a boiler consuming pulverized fuel or a fluidized combustion boiler. For example, in the latter case, the ash output of the combustion bed will have a temperature of about 900° C. If the ashes are to be cooled in a heat exchanger to about 130° C., for example in a tubular heat exchanger, the hot ashes flow around a tubular system and the moisture arising from the drying installation flows inside the system. The following calculations show that it is possible to recuperate and recycle the heat of the spent ashes:

Mean specific heat of ashes (100°–900° C.)—0.22 cal/kg °C.

Ash content in raw fuel: 16%

(0.16×0.22×(900−130)=27.1 cal/kg.

The superheating of the evaporated moisture is carried out in two stages: In the first stage the evaporated moisture picks up some 27 cal/kg of raw fuel from the hot combustion residue, in the second stage it is further superheated in the superheater 24 adding to its enthalpy (2545.92−2492.1)−27=26.82, say 27 cal/kg of raw fuel.

We claim:

1. An energetically cross-linked process for the drying and thermal processing of moisture containing solids comprising the steps of:
 (a) heating the moisture containing solids to a temperature below that of the decomposition of any organic component thereof so as substantially to dry the solids by evaporating out the moisture content thereof;

(b) condensing the vapours from step (a) at least partially in indirect heat exchange with the moisture containing solids and thereby transferring part of the enthalpy of these vapours to the moisture containing solids so as to contribute to the heating of step (a);

(c) upgrading the enthalpy of the condensate formed in step (b) by utilisation of the heat generated or released in the energetically cross-linked processing stage;

(d) utilising at least part of this upgraded enthalpy for completing the heating in step (a) and utilising any residual upgraded enthalpy in the energetically cross-linked processing stage; and (e) carrying out the thermal processing of the solids dried in step (a).

2. A process according to claim 1 wherein the moisture evaporated in step (a) is compressed to such an extent that its condensation temperature is higher than the evaporation temperature of step (a) before being condensed in step (b).

3. An energetically cross-linked process including the drying and combustion of moisture containing solids comprising the steps of:

(a) heating the moisture containing solids to a temperature below that of the decomposition of any organic component thereof so as substantially to dry the solids by evaporating out the moisture content thereof;

(b) carrying out the combustion thereof;

(c) filtering at least part of the vapour formed in step (a) to remove dust therein;

(d) upgrading the enthalpy of at least part of the vapours formed in step (a) and filtered in step (c) by utilisation of waste heat generated or released in the combustion of step (b); and (e) condensing at least part of the vapours from step (d) in indirect heat exchange with the moisture containing solids while continuously moving said solids from a moist solids inlet to a dried solids outlet and thereby transferring part of the enthalpy of these vapours to the moisture containing solids so as to effect the heating of step (a).

4. A process according to claim 3 wherein said heat exchange is effected in countercurrent flow.

5. A process according to claim 3 wherein said moisture containing solids are caused to flow turbulently with respect to said vapours.

6. A process according to claim 3 comprising the further step of regulating the rate of movement of the moisture containing solids during heat exchange so as to ensure a substantially constant temperature of the dried solids prior to combustion.

7. A process according to claim 3 wherein the degree of said upgrading is regulated so as to ensure a substantially constant temperature of the dried solids prior to combustion.

8. A process according to claim 3 wherein said heat exchange is effected at atmospheric pressure.

9. A process according to claim 3 wherein said heat exchange is effected at sub-atmospheric pressure.

10. A process according to claim 3 wherein said heat exchange is effected at super-atmospheric pressure.

11. An energetically cross-linked process for the drying and thermal processing of moisture containing solids comprising the steps of:

(a) heating the moisture containing solids to a temperature below that of the decomposition of any organic component thereof so as substantially to dry the solids by evaporating out the moisture content thereof;

(b) upgrading the enthalpy of a portion of the vapours from step (a) by utilisation of the heat generated or released in the energetically cross-linked processing stage;

(c) utilising this upgraded enthalpy for carrying out the heating in step (a) in direct heat exchange whilst maintaining the vapours which are thereby cooled at a temperature above their condensation point;

(d) condensing the remaining portion of the vapours from step (a) and utilising the condensate thus formed in the energetically cross-linked processing; and (e) carrying out the thermal processing of the solids dried in step (a).

12. A process according to claim 11 wherein said condensation of step (d) takes place in heat exchange with an input fluid of the energetically cross-linked processing stage thereby upgrading said input fluid which is fed to the processing stage.

13. Apparatus for carrying out the process according to claim 11 and comprising a drying installation and a thermal processing installation coupled thereto, said drying installation comprising a fluidisation bed enclosure, moisture containing solid input means communicating with an inlet of said enclosure, dried solid output means communicating with an outlet of said enclosure and vapour inlet and outlet of said enclosure for coupling to vapour flow means and such that vapour can flow in direct contact heat exchange with solids in said fluidisation bed.

14. A process according to claim 3 and comprising the additional step of:

(f) condensing at least part of any remaining vapours of those produced in steps (a) or (c) and utilizing their enthalpy and the residual upgraded enthalpy of the condensate of step (e) in an energetically cross-linked stage including said combustion.

15. A process according to claim 14 wherein said condensate is subjected to filtering prior to its utilisation in the energetically cross-linked processing.

16. A process according to claim 14 wherein said condensate is subjected to chemical treatment prior to its utilisation in the energetically cross-linked processing.

17. A process according to claim 3 wherein said solids are in a heated state when said combustion commences.

18. Apparatus for carrying out an energetically cross-linked drying and combustion of moisture containing solids and comprising a drying installation and a combustion installation coupled thereto, said drying installation comprising:

an enclosure, moisture containing solid input means communicating with an upper inlet of said enclosure, dried solid output means communicating with a lower outlet of said enclosure, means for ensuring continuous movement of said solids from said inlet to said outlet along the height of of said enclosure;

means for removing vapours from said enclosure, means for filtering said vapours, vapour heating means for heating said filtered vapour by indirect heat exchange with waste heat from said combustion installation;

a plurality of hollow heat exchange units rotatably and substantially horizontally mounted in said enclosure and spaced along the height thereof, each unit having a vapour inlet and outlet, at least some of said units being connected in series, with the vapour outlet of at least one lower unit being coupled to the vapour inlet of a higher succeeding unit, the inlet to the first of said units being coupled to the heated vapour outlet of said vapour heating means;

condensate drainage outlets of said heat exchange units and coupling means for effecting respective communication paths between said enclosure and said combustion installation for the flow of vapours, condensate and dried solids.

19. Apparatus according to claim 18 wherein said input means is provided with an airlock.

20. Apparatus according to claim 18 wherein said output means is provided with an airlock.

21. Apparatus according to claim 18 wherein each heat exchange unit comprises a hollow casing rotatably journalled with respect to the enclosure, the outer wall of said casing being formed with fins directed at an acute angle thereto and adapted to be impacted by the falling solids thereby causing said casing to rotate.

22. Apparatus according to claim 18 wherein each casing is keyed to one or more sprockets, the sprockets of said casing being coupled by means of a common coupling chain.

23. Apparatus according to claim 18 wherein the sprockets of the differing cases are of the same pitch thereby ensuring the rotation of said casings at substantially the same rate.

24. Apparatus according to claim 18 wherein the pitch diameters of the sprockets of the casings decrease downstream in a substantially stepwise fashion in proportion with the rate of diminution of the mass of the downflowing drying solids.

25. Apparatus according to claim 21 wherein braking means are provided for limiting the rate of rotation of said casings.

* * * * *